(12) United States Patent
Husmann

(10) Patent No.: US 10,507,935 B1
(45) Date of Patent: Dec. 17, 2019

(54) ORTHOGONAL SHEAR STRUCTURE

(71) Applicant: Chris H. Husmann, Gardena, CA (US)

(72) Inventor: Chris H. Husmann, Gardena, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 15/969,202

(22) Filed: May 2, 2018

(51) Int. Cl.
| | | |
|---|---|---|
| *B64D 37/06* | (2006.01) | |
| *B64C 3/26* | (2006.01) | |
| *B64C 3/34* | (2006.01) | |
| *F28F 7/00* | (2006.01) | |
| *F28D 21/00* | (2006.01) | |
| *B64D 37/34* | (2006.01) | |

(52) U.S. Cl.
CPC .............. *B64D 37/06* (2013.01); *B64C 3/26* (2013.01); *B64C 3/34* (2013.01); *B64D 37/34* (2013.01); *F28D 21/0003* (2013.01); *F28F 7/00* (2013.01); *F28D 2021/0021* (2013.01)

(58) Field of Classification Search
CPC ........ B64D 37/06; B64D 37/02; B64D 37/04; B64D 13/006; B32B 3/12; B32B 3/18; B32B 3/20; B32B 3/22; B32B 3/263; B32B 3/266; B64C 3/26; B64C 2003/143; B64C 3/22; B64C 1/38; B64C 1/08; E04C 2002/3488; E04C 2/525
See application file for complete search history.

(56) References Cited

U.S. PATENT DOCUMENTS

| | | | | | |
|---|---|---|---|---|---|
| 3,220,152 | A | * | 11/1965 | Sturm ....................... | E04B 1/19 446/125 |
| 4,986,495 | A | * | 1/1991 | Stromath .................. | B64C 1/38 244/117 A |
| 5,423,498 | A | * | 6/1995 | Fluegel ..................... | B64C 1/38 165/41 |
| 5,716,693 | A | * | 2/1998 | Pittman .................... | B32B 3/20 428/178 |
| 9,309,000 | B2 | * | 4/2016 | Piesker ................. | B64D 13/00 |
| 2015/0336680 | A1 | * | 11/2015 | Schumacher ............ | F17C 3/00 244/135 B |
| 2016/0236768 | A1 | * | 8/2016 | Okamoto .................. | B64C 3/26 |
| 2017/0050741 | A1 | * | 2/2017 | Bingham ............... | B64D 37/06 |

* cited by examiner

*Primary Examiner* — Tho V Duong
(74) *Attorney, Agent, or Firm* — Tarolli, Sundheim, Covell & Tummino LLP

(57) ABSTRACT

A support structure for reinforcing first and second skins in an aircraft component includes a plurality of core members connected together to form at least one layer. Each core member has a geometrically isotropic shape.

10 Claims, 6 Drawing Sheets

US 10,507,935 B1

ORTHOGONAL SHEAR STRUCTURE

This invention was made with Government support under Contract No. FA8650-11-D-5703. The Government has certain rights in this invention.

TECHNICAL FIELD

The present invention relates generally to support structures for aircraft and, more specifically relates to a geometrically isotropic support structure.

SUMMARY

An example support structure for reinforcing first and second skins in an aircraft component includes a plurality of core members connected together to form at least one layer. Each core member having a geometrically isotropic shape.

In another example, a support structure for reinforcing first and second skins in an aircraft component includes a plurality of hollow core members each having a geometrically isotropic shape and defining an interior space. A plurality of projections extends radially outward from each core member and a passage extends through each projection into the interior space. The projections connect adjacent core members to one another such that the core members are longitudinally aligned with one another into a plurality of rows and columns forming at least one layer.

In another example, a heat exchanger for a fuel tank of an aircraft includes a support structure having a plurality of core members connected together by projections to form at least one layer for engaging the fuel tank. Each core member has a geometrically isotropic shape and defines an interior space. Passages in the projections fluidly interconnect the interior spaces. An intake manifold is fluidly connected to the interior spaces of the core members for directing heated fluid thereto to be conducted into the fuel tank. An exit manifold is fluidly connected to the interior spaces of the core members for directing the heated fluid out of the interior spaces.

Other objects and advantages and a fuller understanding of the invention will be had from the following detailed description and the accompanying drawings.

DETAILED DESCRIPTION

Figure 1:
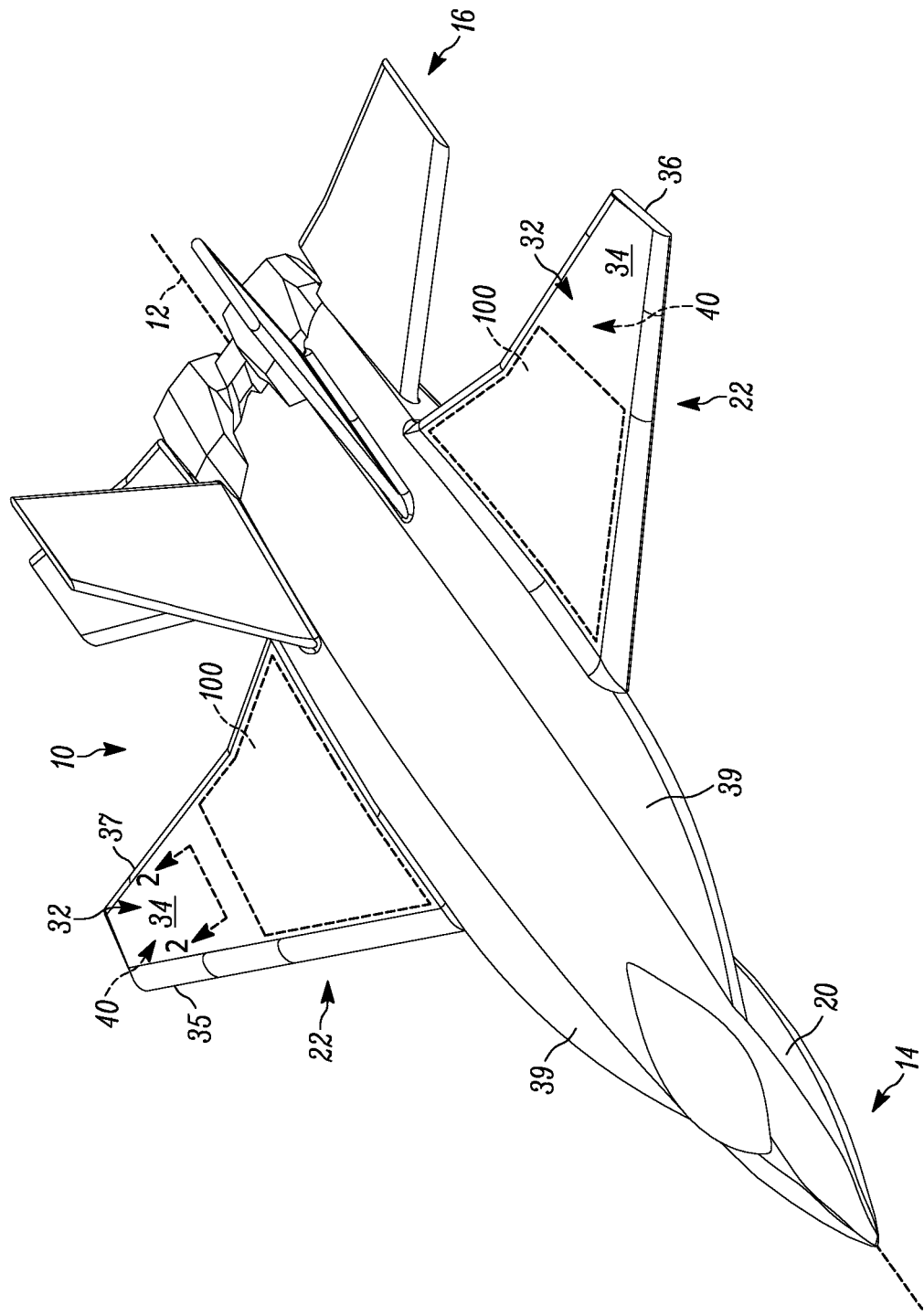
FIG. 1 is an aircraft including an example support structure.

The present invention relates generally to support structures for aircraft and, more specifically relates to a geometrically isotropic support structure. FIG. 1 illustrates an aircraft 10 including an example support structure 40 in accordance with the present invention. The aircraft 10 extends from a centerline 12 from a first or fore end 14 to a rear or aft end 16. The aircraft 10 includes a fuselage 20 extending generally along the centerline 12.

A pair of wings 22 extends on opposite sides of the centerline 12 from the fuselage 20. Each wing 22 has an outer mold line (OML) 32 defined by an upper skin 34 and a lower skin 36. The OML 32 defines a leading edge 35 and trailing edge 37 of each wing 22. In some aircraft 10, such as stealth aircraft, chines 39 extend between the fuselage 20 and the wings 22 on opposite sides of the centerline 12. One or more fuel storage tanks 100 can be provided in the wings 22 within the OML 32.

Figure 2:
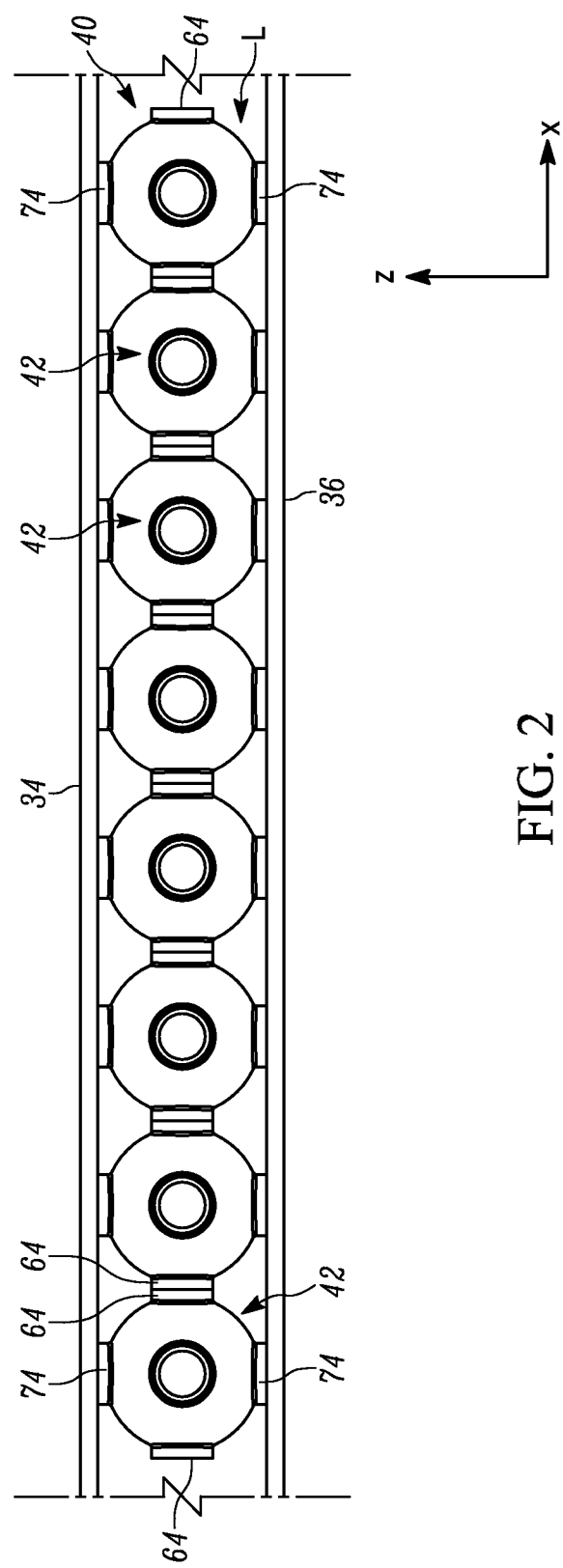
FIG. 2 is a section view taken along line 1-1 of FIG. 1 including the support structure.

Referring further to FIG. 2, the support structure 40 is secured to the skins 34, 36 to increase the durability, rigidity, and wear resistance of the OML 32 in a lightweight, efficient manner. To this end, the support structure 40 can be used in any portion(s) of the wing 22 (or the entirety of the wing) that experiences shear load, e.g., along the leading edge, along the trailing edge, adjacent the fuselage 20, etc. The support structure 40 could alternatively or additionally be used in any other portion of the aircraft 20 where it is desirable to mitigate shear stresses, e.g., in the fuselage 20, chines 39 or rear stabilizers.

Figure 3:
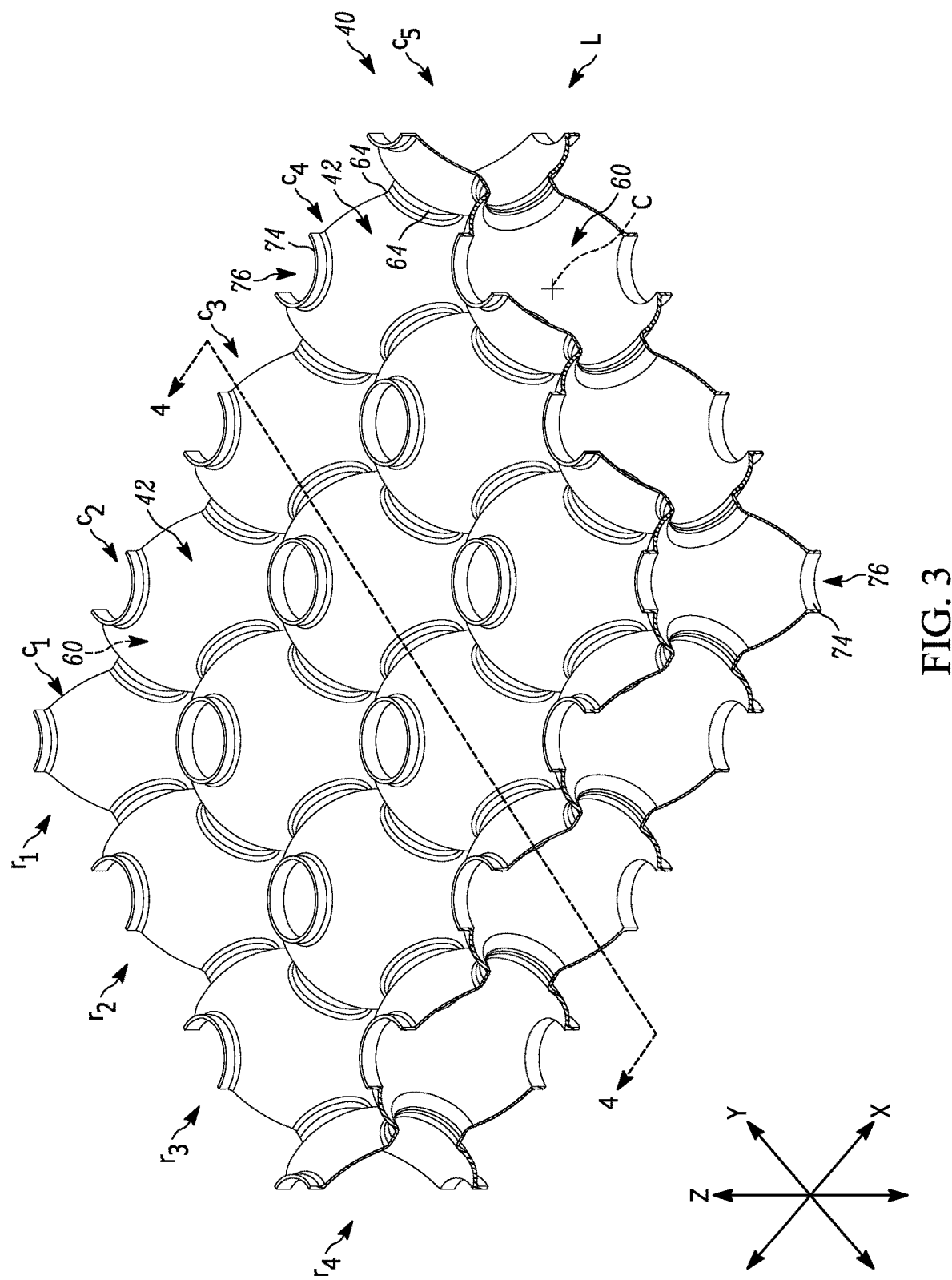
FIG. 3 is an enlarged perspective view of a portion of the support structure.
Figure 4:
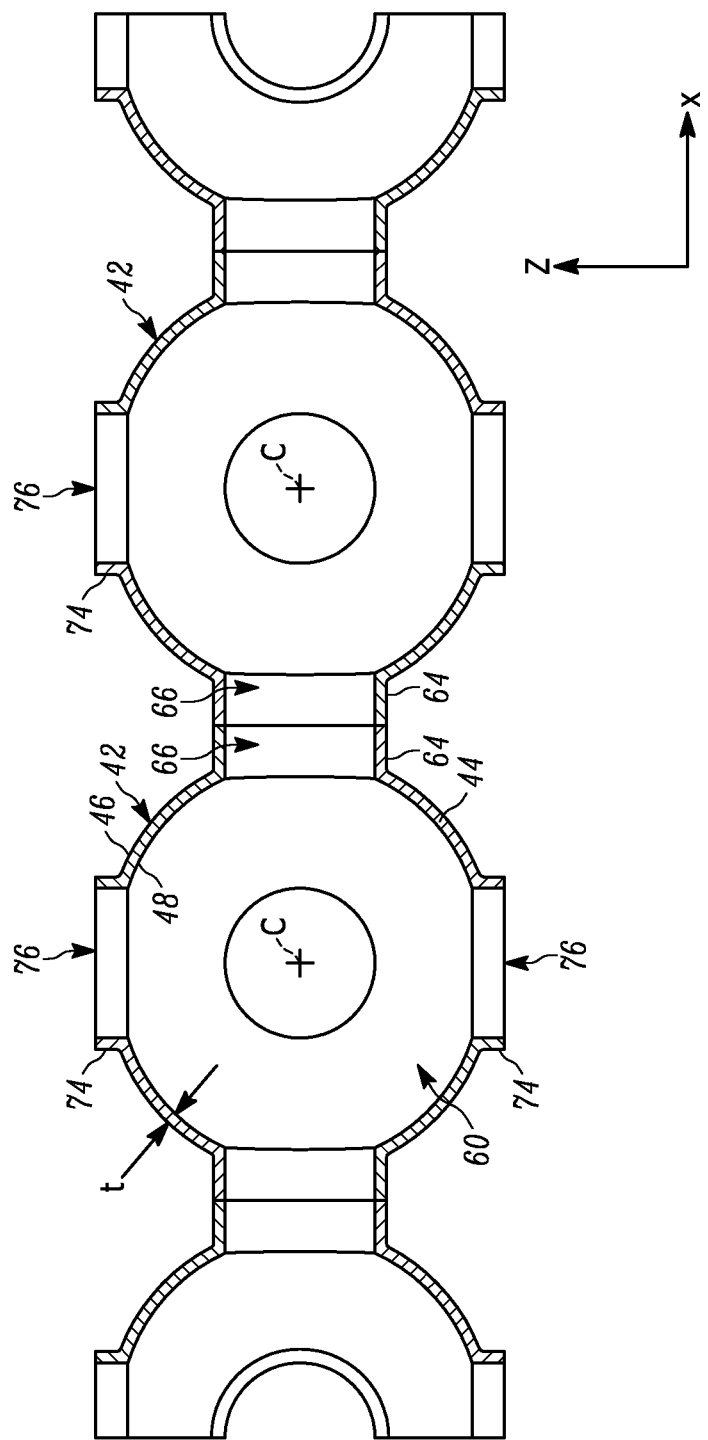
FIG. 4 is a section view taken along line 4-4 of FIG. 3.

Referring FIGS. 3-4, the support structure 40 includes a plurality of hollow core members 42 connected together in a predetermined configuration or array. Collectively, as shown, the core members 42 are arranged in a single layer L extending within a x-y plane of an x-y-z Cartesian coordinate system. Although the core members 42 are illustrated as being spherical it will be appreciated that the core members can have alternative shapes such as a multi-sided polygon, e.g., a 14-sided polygon. The core members 42 can also be different shapes from one another (not shown).

Each core member 42 has a wall 44 formed in a round or spherical shape and defining a geometric center C. The wall 44 includes an outer surface 46 and an inner surface 48 defining an interior space 60. The wall 44 has a thickness (t) defined between the inner and outer surfaces 46, 48. As shown, the wall thickness t is constant for each core member 42 and between core members. It will be appreciated, however, that the wall thickness t can vary within any one core member 42 and/or between core members (not shown). Alternatively, the core members 42 can be solid and, thus, free of an interior space 60 (not shown). In any case, the core members 42 are formed from a resilient material, e.g., an elastomer or metal, that is compressible to a predetermined degree without experiencing plastic deformation.

First projections 64 are provided around the outer surface 46 of each core member 42. As shown, four first projections 64 extend radially outward from the outer surface 46 in an x-y plane including the center C. The first projections 64 are arranged at 90° intervals from one another about the center C and therefore are symmetrically arranged about the core member 42. Consequently, diametrically opposed pairs of the first projections 64 are aligned with one another in directions extending through the center C. Each first projection 64 has a generally frustoconical shape with a rounded sidewall. A passage 66 extends from the interior space 60, entirely through each first projection 64, and to the exterior of the core member 42.

A pair of second projections 74 is also provided around the outer surface 46 of each core member 42. More specifically, the second projections 74 extend radially outward from the outer surface 46 in opposite directions along the z-axis. The second projections 74 are therefore diametrically opposed from one another about the center C on opposite sides of the x-y plane including the first projections 64. As a result, the first and second projections 64, 74 are equidistantly spaced from one another in a symmetric manner about the outer surface 46 of each core member 42. Other arrangements for the first and second projections 64, 74, however, are contemplated.

Each second projection 74 has the same shape as the first projections 64. A passage 76 extends from the interior space 60, entirely through each second projection 74, and to the exterior of the core member 42. It will be appreciated that both sets of projections 64, 74 can be free of passages when the core members 42 are solid (not shown). In any case, the second projections 74 are securely fixed to the upper skin 34 and lower skin 36 as shown in FIG. 2 via adhesive, fasteners, etc. This prevents relative movement between the [upper] second projections 74 and the upper skin 34 and between the [lower] second projections and the lower skin 36. As a result, forces experienced by the skins 34, 36 are transferred directly to the core members 42.

The first projections 64 on adjacent core members 42 are connected together to arrange the core members in the layer L within the x-y plane. As shown in FIG. 3, the core members 42 define a layer L including a series of rows $r_1$, $r_2$, ... $r_n$ and columns $c_1$, $c_2$, ... $c_n$. Although four rows and five columns are shown in FIG. 3 it will be appreciated that the layer L can include any number of rows and/or columns sufficient to support the skins 34, 36 over the desired portion(s) of the wing 22. Moreover, differently-shaped core members 42 can be arranged in a recurring pattern in any row and/or column (not shown). In any case, the symmetric arrangement of the first projections 64 about the core member 42 readily allows up to four core members to be directly connected to a single core member at 90° intervals.

The passages 66 through connected first projections 64 are aligned with one another and with the centers C of the core members 42 from which the first projections extend. Consequently, the passages 66 in the first projections 64 in each row r are aligned with one another in the x-direction. The passages 66 in the first projections 64 in each column c are aligned with one another in the y-direction.

Figure 5:
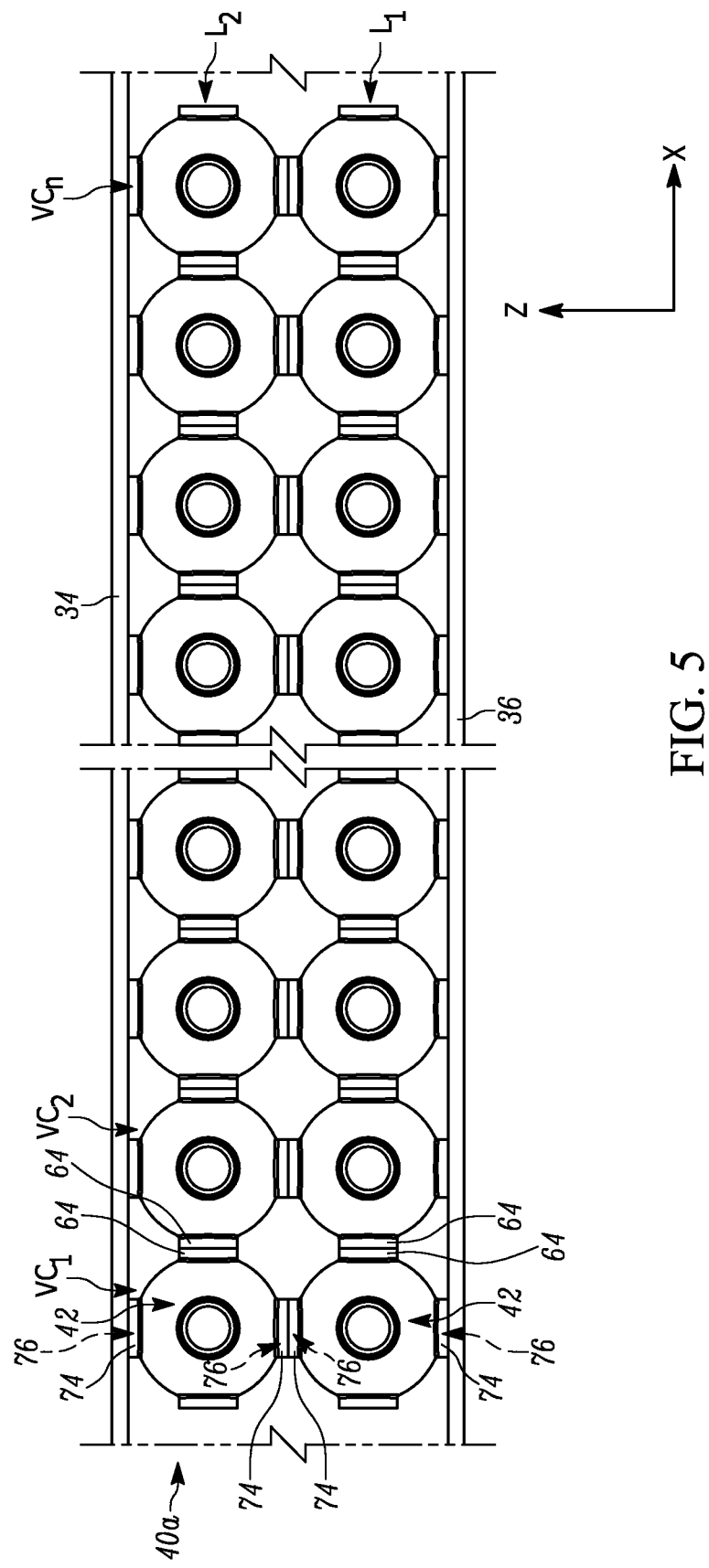
FIG. 5 is a section view taken along line 1-1 of FIG. 1 in another example in which the support structure is multiple layers.

In another example shown in FIG. 5, the support structure 40a includes core members 42 arranged in multiple layers L stacked atop one another in the z-direction. Although two layers $L_1$, $L_2$ are shown it will be appreciated that the support structure 40a can include any number of layers. In this construction, each layer $L_1$, $L_2$ is configured as described above and the core members 42 in one layer $L_1$ are secured to the core members in other layers via the second projections 74. More specifically, the second projections 74 in each layer $L_1$, $L_2$ are all aligned with one another in the z-direction to form vertical columns $vc_1$, $vc_2$, ... $vc_n$. Consequently, the passages 76 in each vertical column vc are all aligned with one another.

As with the single layer L support structure 40, the second projections 74 in the support structure 40a are rigidly secured directly to OML 32. More specifically, the [lower] second projections 74 in the layer $L_1$ are rigidly secured directly to the lower skin 36. The [upper] second projections 74 in the layer $L_2$ are rigidly secured directly to the upper skin 34.

The arrangement and configurations of the core members 42 described herein is advantageous for several reasons. First, the curved walls 44 of the core members 42 resist buckling when loads are applied to the support structure 40, 40a. Second, the symmetric arrangement of both the core members 42 in the x-y plane and the projections 64, 74 on each core member allows the support structure to be geometrically isotropic, i.e., resist and react to stress equally in all directions. This is true regardless of the number of layers L in the support structure. For these reasons, the support structure 40, 40a can resist crushing and shear forces with approximately equal force in each of the x-, y-, and z-directions when loads are applied to the support structure during operation of the aircraft 10. This includes, for example, flight-induced loads on the wings 22, chines 39, fuselage 20, etc.—depending on where the support structures are located in the aircraft 10. To this end, the support structure 40 resists shear forces that build up between the skins 34, 36 when the wings 22 experience bending forces.

The support structure 40, 40a can be manufactured using three-dimensional printing and additive manufacturing. Consequently, the core members 42 can all be integrally formed and connected to one another without requiring additional fasteners or connections therebetween. Additive manufacturing the core members 42 also allows each core member, and the arrangement between core members, to be readily adjusted based on design criterion, e.g., the type and direction(s) of loads the support structure 40 is expected to undergo during operation of the aircraft. Accordingly, the support structure can readily include any number of rows, columns, and vertical columns. The thickness t and/or diameter of each core member 42 can also be adjusted.

Figure 6:
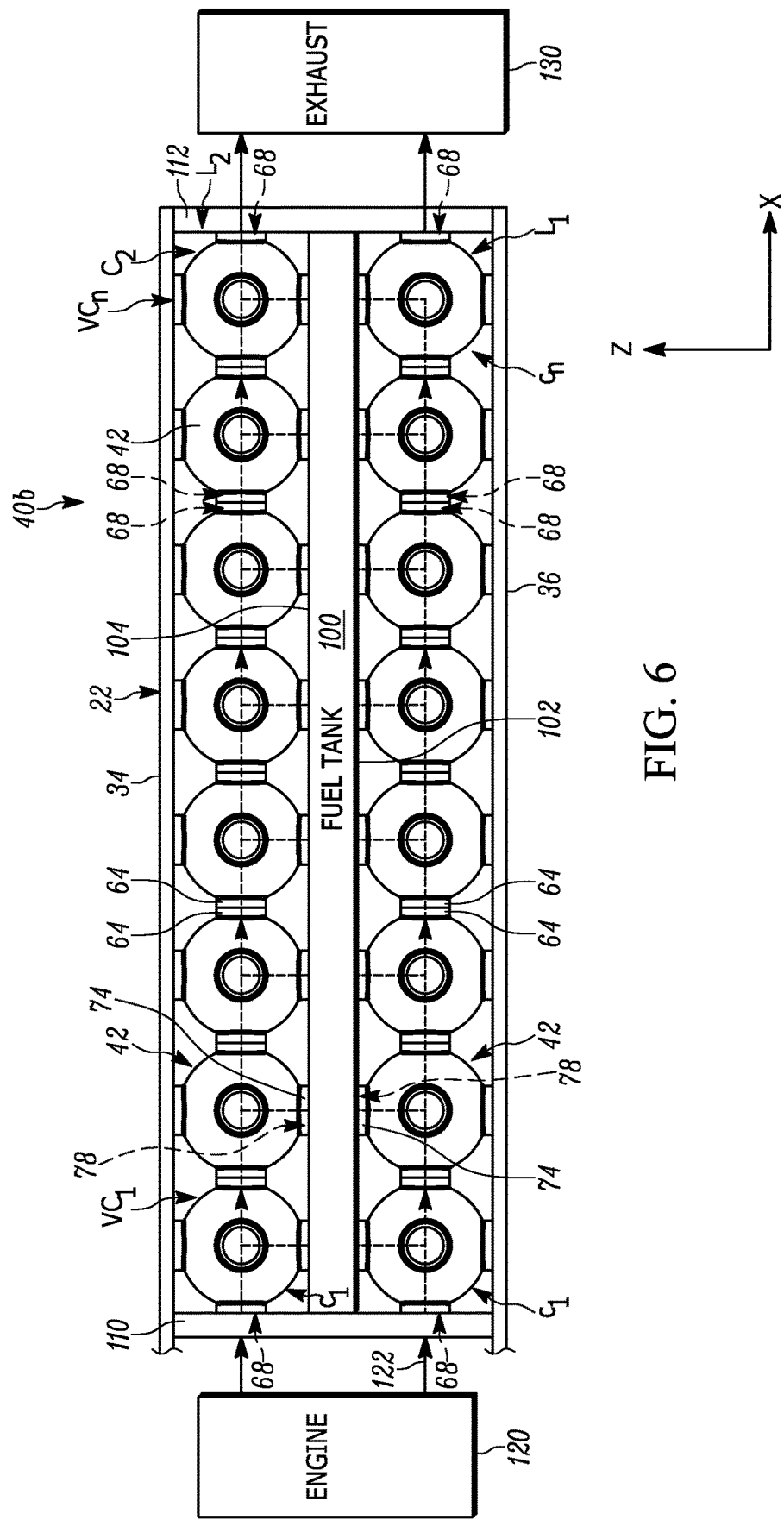
FIG. 6 is a schematic illustration in which the support structure further functions as a heat exchanger.

FIG. 6 illustrates another example support structure 40b of the present invention that also functions as a heat exchanger. In this example, the support structure 40b includes a pair of layers $L_1$, $L_2$ positioned on opposite sides of a fuel tank 100 in one of the wings 22 (see also FIG. 1 in phantom). Alternatively, a single layer L support structure 40b could be positioned above or below the fuel tank 100 (not shown).

Each layer $L_1$, $L_2$ directly engages the fuel tank 100 and one of the skins 34, 36. More specifically, the [upper] second projections 74 in the layer $L_1$ are rigidly secured directly to a first surface 102 of the fuel tank 100. The [lower] second projections 74 in the layer $L_1$ are rigidly secured directly to the lower skin 36. The [lower] second projections 74 in the layer $L_2$ are rigidly secured directly to a first surface 102 of the fuel tank 100. The [upper] second projections 74 in the layer $L_2$ are rigidly secured directly to the upper skin 34.

An intake manifold 110 is fluidly connected to the passages 68 of the core members 42 in the first column $c_1$ of each layer $L_1$, $L_2$. The manifold 112 is therefore fluidly connected to every row $r_1$-$r_n$ of every layer $L_1$, $L_2$. An exit manifold 112 is fluidly connected to the passages 68 of the core members 42 in the last column $c_n$ of each layer $L_1$, $L_2$. The manifold 112 is therefore fluidly connected to every row $r_1$-$r_n$ of every layer $L_1$, $L_2$. Since all the core members 42 in each layer $L_1$, $L_2$ are hollow and include the passages 68, the interior spaces 60 of the core members within each layer are fluidly connected to one another and to both manifolds 110, 112. The manifold 112 is configured to receive a heated fluid and direct the heated fluid to both layers $L_1$, $L_2$ of the support structure 40b. In one example, the heated fluid is hot exhaust gases 122 from the engine 120.

During flight, the aircraft 10 travels at elevations where the air temperature, coupled with high flight speeds, can significantly decrease the temperature of the fuel stored within the fuel tank 100. Consequently, it is desirable to maintain the fuel temperature above a predetermined level to help ensure the fuel does not freeze during operation of the aircraft 10.

As the aircraft 10 operates, the engine generates hot exhaust gases 122. These gases 122 are routed to the manifold 110, which distributes the hot exhaust gas into each layer $L_1$, $L_2$ in the support structure 40b via the passages 68 in the column $c_1$. The hot exhaust gases 122 travel through the layers $L_1$, $L_2$ as indicated in the dashed arrows in FIG. 6 (in the left-to-right direction as shown). As this occurs, heat from the exhaust gases 122 is conducted through the second projections 74 and surfaces 102, 104 of the fuel tank 100. The hot exhaust gases 122 also flow into the passages 78 in the second projections 74 and come in direct contact with the surfaces 102, 104 via the passages 76 in the second projections 74. As a result, the hot exhaust gases 122 help maintain the temperature of the fuel above the predetermined level.

To this end, the core members 42 can be configured to maximize the degree to which the hot exhaust gases 122 interact with the surfaces 102, 104 of the fuel tank 100. This can include, for example, the degree of exposed surface the hot exhaust gases 122 contact on the fuel tank 100, the flow velocity through the layers $L_1$, $L_2$, etc. The shape and/or wall thickness t of each core member 42 can also be adjusted or varied to maximize thermal conduction along the core member-fuel tank interface while providing adequate structural support for the wing 22.

The exhaust gases 122 ultimately pass through the passages 68 in the last columns $c_n$ into the exit manifold 112. Depending on the temperature of the exhaust gases 122 entering the exit manifold 112, the exhaust gases 122 can be recycled back to the intake manifold 110 or expelled out of the aircraft 10 entirely. In either case, the support structure 40b not only provides geometrically isotropic support for the aircraft 10 but also acts as a heat exchanger to help maintain stored fuel on the aircraft above a predetermined temperature.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A support structure for reinforcing first and second skins in an aircraft component, comprising:
   a plurality of core members connected together to form at least one layer, each core member having a geometrically isotropic shape, each core member including a plurality of projections for connecting the core members together, each core member being hollow and defining an interior space, a passage extending through each projection into the interior space; and
   a manifold fluidly connected to the interior spaces for directing heated fluid into the core members to heat a component of the aircraft engaging the core members.

2. The support structure recited in claim 1, wherein the core members are integrally formed with one another into a single component.

3. The support structure recited in claim 1, wherein the core members are spherical.

4. The support structure recited in claim 1, wherein the passages in adjacent core members are longitudinally aligned with one another.

5. The support structure recited in claim 1, wherein the projections are symmetrically arranged about the outer surface of the core members.

6. The support structure recited in claim 1, wherein each core members has a polygonal shape.

7. The support structure recited in claim 1, wherein at least one core member includes a wall with a variable thickness.

8. The support structure recited in claim 1, wherein the core members are longitudinally aligned with one another into a plurality of rows and columns forming the at least one layer.

9. The support structure recited in claim 1, wherein the core members are longitudinally aligned with one another into a plurality of rows and columns forming a first layer and a second layer stacked on and aligned with the first layer.

10. A heat exchanger for a fuel tank of an aircraft, comprising:
    a support structure comprising a plurality of core members connected together by projections to form at least one layer for engaging the fuel tank, each core member having a geometrically isotropic shape and defining an interior space, wherein passages in the projections fluidly interconnect the interior spaces;
    an intake manifold fluidly connected to the interior spaces of the core members for directing heated fluid thereto to be conducted into the fuel tank; and
    an exit manifold fluidly connected to the interior spaces of the core members for directing the heated fluid out of the interior spaces.

* * * * *